(12) United States Patent
Lin et al.

(10) Patent No.: US 6,610,196 B1
(45) Date of Patent: *Aug. 26, 2003

(54) CATALYTIC REFORMING PROCESS

(75) Inventors: Fan-Nan Lin, Bartlesville, OK (US); John S. Parsons, Bartlesville, OK (US)

(73) Assignee: ConocoPhillips Company, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/667,482

(22) Filed: Sep. 22, 2000

Related U.S. Application Data

(60) Provisional application No. 60/167,284, filed on Nov. 24, 1999.

(51) Int. Cl.[7] .............................................. C10G 35/085
(52) U.S. Cl. ...................... 208/138; 208/134; 208/135; 208/137; 208/140; 502/20; 502/22; 502/32
(58) Field of Search .................. 208/134, 135, 208/137, 138, 139, 140; 502/20, 22, 32

(56) References Cited

U.S. PATENT DOCUMENTS

| | | | | |
|---|---|---|---|---|
| 2,952,611 A | | 9/1960 | Haxton et al. ................ 208/65 |
| 3,649,524 A | | 3/1972 | Derr et al. ................... 208/139 |
| 3,705,095 A | | 12/1972 | Dalson et al. ................ 208/65 |
| 4,059,645 A | * | 11/1977 | Jacobson ................ 260/668 A |
| 4,066,740 A | * | 1/1978 | Erickson ..................... 423/628 |
| 4,832,821 A | | 5/1989 | Swan, III ..................... 208/65 |
| 5,318,689 A | * | 6/1994 | Hsing et al. .................. 208/70 |
| 5,360,534 A | * | 11/1994 | Rice et al. ................... 208/139 |
| 6,013,847 A | * | 1/2000 | Lin ............................. 585/269 |
| 6,140,546 A | * | 10/2000 | Lin et al. .................... 585/419 |
| 6,140,547 A | * | 10/2000 | Lin et al. .................... 585/743 |
| 6,291,381 B1 | * | 9/2001 | Lin et al. ..................... 502/35 |
| 6,294,492 B1 | * | 9/2001 | Lin ............................. 502/35 |

* cited by examiner

*Primary Examiner*—Nadine G. Norton
(74) *Attorney, Agent, or Firm*—Jeffrey R. Anderson

(57) ABSTRACT

A substantially water-free hydrocarbon feed is charged to a reformer reactor operated under reforming conditions; thereafter, a chlorine-containing additive is introduced, without the simultaneous introduction of water, into the substantially water-free hydrocarbon feed being charged to the reformer reactor in an amount and for a time period that are effective to inhibit deactivation of the reformer catalyst; thereafter, the introduction of the chlorine-containing additive is terminated and the charging of the substantially water-free hydrocarbon feed to the reformer reactor is continued.

43 Claims, 2 Drawing Sheets

CATALYTIC REFORMING PROCESS

This application claims the benefit of U.S. Provisional Application Ser. No. 60/167,284, filed Nov. 24, 1999.

This invention relates to an improved catalytic reforming process. In another aspect, this invention relates to a method for inhibiting the deactivation of a reformer catalyst. In a further aspect, this invention relates to a method for reactivating a partially deactivated reformer catalyst.

BACKGROUND OF THE INVENTION

Catalytic reforming is a well established refining process employed by the petroleum industry for upgrading low-octane hydrocarbons to higher-octane hydrocarbons. Typically, catalytic reforming involves the contacting of a naphtha hydrocarbon feed with a reformer catalyst under elevated temperatures and pressures.

Reformer catalysts typically comprise a metal hydrogen transfer component or components, a halogen component, and a porous inorganic oxide support. A reformer catalyst which has been employed widely throughout the petroleum industry comprises platinum as the metal hydrogen transfer component, chlorine as the halogen component, and alumina as the support. Also, additional metallic promoter components, such as rhenium, iridium, ruthenium, tin, palladium, germanium and the like, have been added to the basic platinum-chlorine-alumina catalyst to create a bimetallic catalyst with improved activity, selectivity, or both.

In a conventional reforming process, a series of two to five reformer reactors constitute the heart of the reforming unit. Each reformer reactor is generally provided with a fixed bed or beds of catalyst which receive upflow or downflow feed. Each reactor is provided with a heater because the reactions which take place therein are predominantly endothermic. In a typical commercial reformer, a naphtha feed with a diluent of hydrogen or hydrogen recycled gas is passed through a preheat furnace, then downward through a reformer reactor, and then in sequence through subsequent interstage heaters and reactors connected in series. The product of the last reactor is separated into a liquid fraction and vaporous effluent. The vaporous effluent, a gas rich in hydrogen, may then be used as hydrogen recycled gas in the reforming process.

During operation of a conventional catalytic reforming unit, the activity of the reformer catalyst gradually declines over time. There are believed to be several causes of reformer catalyst deactivation, including, (1) formation of coke within the pores, as well as on the surface, of the catalyst, (2) agglomeration of the catalyst metal component or components, and (3) loss of the halogen component. Deactivation of a reformer catalyst can have the following negative impacts on the reforming process: (1) lower product octane number; (2) higher required reaction temperature; (3) higher required reaction pressure; (4) decreased time between required catalyst regeneration (cycle time); (5) increased requirement for hydrogen; and (6) decreased selectivity.

It has been previously recognized that the deactivation of a reformer catalyst can be inhibited by contacting the reformer catalyst with a chlorine-containing compound during reforming. This "chloriding" of the reformer catalyst is thought to inhibit catalyst deactivation by (1) counteracting the formation of coke on the catalyst, (2) redispersing the metal component or components of the catalyst in a more uniform manner, and (3) replacing the halogen component which has been stripped from the catalyst during reforming.

Chloriding of a reformer catalyst is generally achieved by injecting a chlorine-containing additive into the hydrocarbon feed charged to the reformer reactor. The chlorine-containing compound is then carried by the hydrocarbon feed into the reformer reactor where it is contacted with the reformer catalyst in a reaction zone.

Past chloriding methods required that the amount of water present in the reaction zone be controlled during the chloriding of a reformer catalyst. The presence of water in the reaction zone of a reformer reactor is generally undesirable because water can cause accelerated coking of the reformer catalyst as well as stripping of the reformer catalyst's halogen component; however, past chloriding methods teach that the presence of water in the reformer reaction zone before, during, or after chloriding is necessary to counteract the excessive hydrocracking which is typically encountered when chloriding a reformer catalyst. Thus, prior to the discovery of the invention taught herein, chloriding of a reformer catalyst in a substantially water-free reaction zone without adding water to the reaction zone before, during, or after chloriding was thought to cause catalyst deactivation.

SUMMARY OF THE INVENTION

It is an object of the present invention to provide an improved reforming process employing a novel method which inhibits deactivation of a reformer catalyst.

It is a further object of the present invention to provide an improved reforming process employing a novel method which reactivates a partially deactivated reformer catalyst.

Further, objects and advantages of the present invention will become apparent from consideration of the specification and appended claims.

Accordingly, one embodiment of the invention is a reforming process that comprises charging a substantially water-free hydrocarbon feed comprising a reformable hydrocarbon to a reformer reactor operated under reforming conditions. Thereafter, a chlorine-containing additive is introduced, without the simultaneous introduction of water, into the substantially water-free hydrocarbon feed being charged to the reformer reactor operated under reforming conditions in an amount and for a time period that are effective to inhibit deactivation of the reformer catalyst. Thereafter, the introduction of the chlorine-containing additive is terminated and the charging of the substantially water-free hydrocarbon feed to the reformer reactor operated under reforming conditions is continued.

Another embodiment of the invention is a reforming process that comprises charging a substantially water-free hydrocarbon feed comprising a reformable hydrocarbon to a reformer reactor operated under reforming conditions for a time period such that the activity of the reformer catalyst decreases to an unacceptable activity. When the activity of the reformer catalyst has declined to an unacceptable activity, perchloroethylene is introduced, without the simultaneous introduction of water, into the substantially water-free hydrocarbon feed in an amount and for a time period that are effective to restore at least a portion of the decrease in the activity of the reformer catalyst. Thereafter, the introduction of the chlorine-containing additive is terminated and the charging of the substantially water-free hydrocarbon feed to the reformer reactor operated under reforming conditions is continued.

Another embodiment of the invention is a reforming process that comprises contacting, under reforming conditions, a reformer catalyst with a substantially water-free hydrocarbon feed containing a concentration of a chlorine-containing additive for a time period that is effective to inhibit deactivation of the reformer catalyst. Thereafter, contacting, under reforming conditions the reformer catalyst with a substantially water-free hydrocarbon feed which contains substantially no chlorine-containing additive.

DETAILED DESCRIPTION OF THE INVENTION

Figure 1:
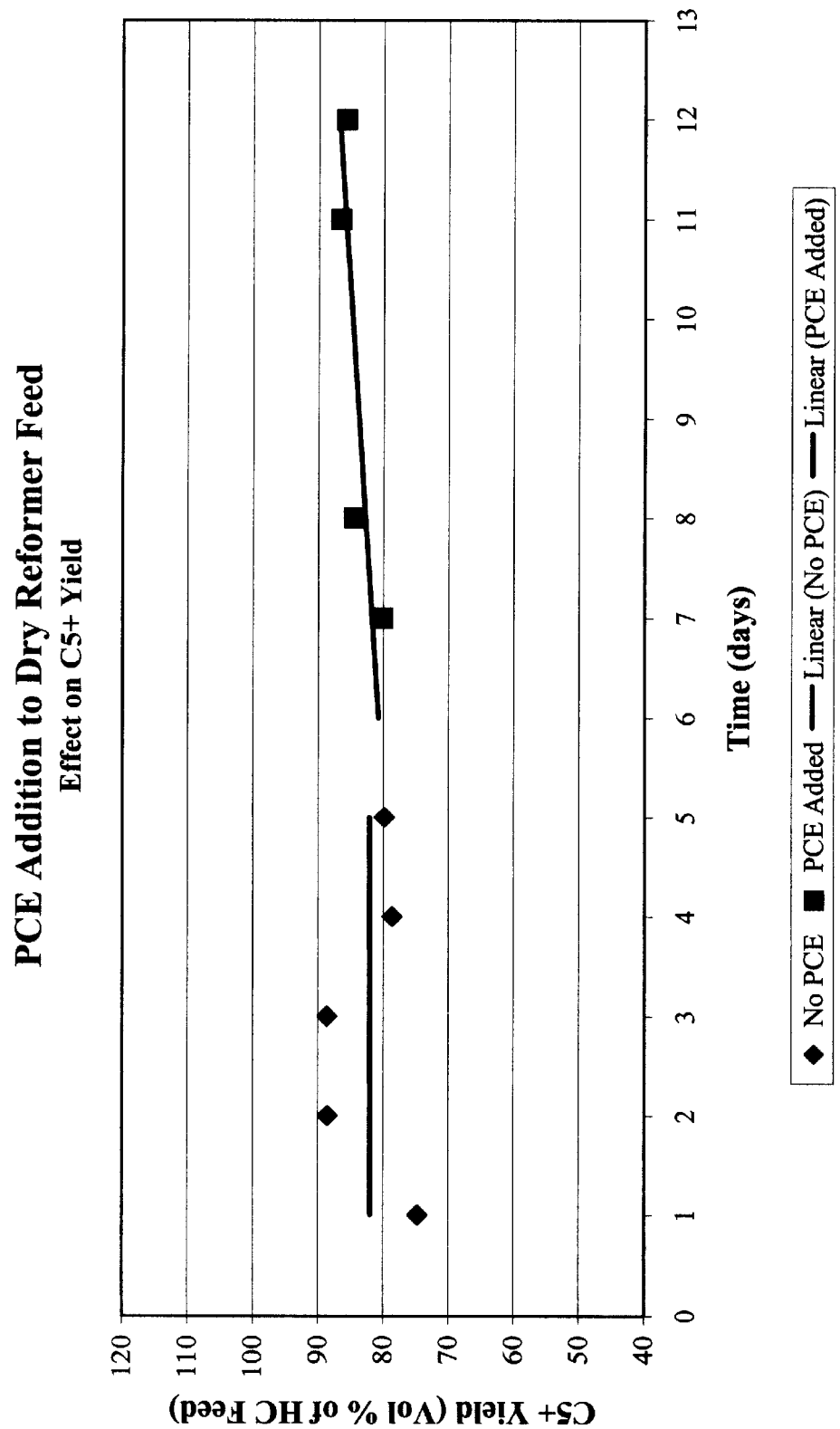
FIG. 1 is a chart plotting C5+ yield as a function of time.

The present invention is based upon the discovery that the deactivation of a reformer catalyst can be substantially inhibited, and even reversed, by introducing a chlorine-containing additive, without simultaneously introducing water, into a substantially water-free hydrocarbon feed being charged to a reformer reactor operating under reforming conditions in a specific amount and for a specific time period and, thereafter, terminating the introduction of the chlorine-containing additive while continuing the charging of the substantially water-free hydrocarbon feed to the reformer reactor operated under reforming conditions.

The reformer reactor employed in practicing the present invention may be any conventional reformer reactor known in the art. The reformer reactor may be a stand-alone reactor or may be part of a multiple-reactor reforming system. The reformer reactor defines a reaction zone which contains a reformer catalyst, usually provided in the form of a bed of such reformer catalyst. The catalyst bed may be fixed or moving, with fixed being the presently preferred configuration.

The reformer catalyst may be any catalyst capable of reforming a reformable hydrocarbon. Preferably, the reformer catalyst comprises at least one Group VIII metal component and a porous support material. More preferably, the reformer catalyst comprises at least one Group VIII metal component, a halogen component, and a porous support material. Even more preferably, the reformer catalyst is a bimetallic catalyst on a support and further including a halogen component, such as, a reformer catalyst comprising platinum, a metal selected from the group consisting of rhenium, iridium, tin, and germanium, a halogen component, and a refractory inorganic oxide support material. Most preferably, the reformer catalyst comprises, consists of, or consists essentially of platinum, rhenium, chlorine, and an alumina support.

The substantially water-free hydrocarbon feed charged to the reformer reactor comprises reformable hydrocarbons. The reformable hydrocarbons include hydrocarbons comprising naphthenes and paraffins that boil within the gasoline boiling range including, for example, straight-run naphthas, natural gasoline, synthetic naphthas, thermal gasoline, catalytically cracked gasoline, partially reformed naphthas, and raffinates from the extraction of aromatics. Preferably, the reformable hydrocarbons are naphtha comprising paraffins, naphthenes, and aromatics that boil within the gasoline boiling range, for example, within the range of from about 80° F. to about 450° F. It is preferred for the naphtha to comprise about 20 volume percent to about 80 volume percent paraffins, about 10 volume percent to about 70 volume percent naphthenes, and about 2 volume percent to about 30 volume percent aromatics.

A diluent may be added to the substantially water-free hydrocarbon feed prior to charging to the reformer reactor. Any diluent recognized in the art may be utilized either individually or in admixture with hydrogen. Hydrogen is the presently preferred diluent because it serves the dual function of lowering the partial pressure of the hydrocarbon feed and suppressing the formation of coke on the reformer catalyst. The weight ratio of diluent-to-reformable hydrocarbon is preferably maintained at from about 1:2 to about 20:1, more preferably from about 1:1 to about 10:1, and most preferably from 3:1 to 6:1. It is preferred that the diluent be substantially water-free, with a water concentration of less than about 50 ppmw (parts per million by weight of the diluent), more preferably less than about 5 ppmw, and most preferably less than 1 ppmw.

It is preferred for the substantially water-free hydrocarbon feed to be hydrotreated before reforming in order to remove impurities such as nitrogen and sulfur. The presence of nitrogen and sulfur in the hydrocarbon feed can cause accelerated deactivation of the reformer catalyst. Preferably, the amount of nitrogen in the substantially water-free hydrocarbon feed is maintained at a level less than about 2.0 ppmw (parts per million by weight of hydrocarbon feed), more preferably less than about 1.0 ppmw, and most preferably less than 0.5 ppmw. Preferably, the amount of sulfur present in the hydrocarbon feed is maintained at a level less than about 2.0 ppmw, more preferably less than about 1.0 ppmw, and most preferably less than 0.5 ppmw.

The reforming conditions employed in the practice of the present invention may be any conditions necessary to effectively convert the substantially water-free hydrocarbon feed into a product of higher octane number. Octane number, as defined by ASTM D2699 for research octane number and ASTM D2700 for motor octane number, is an indication of a fuel's resistance to pre-ignition during the compression stroke of a piston.

The temperature required for reforming varies according to numerous reaction parameters, including, for example, feed composition, catalyst composition, pressure, amount of diluent, and the amount of coke on the reformer catalyst. Generally, the temperature required for reforming is in the range of from about 800° F. to about 1100° F. Ordinarily, the temperature is slowly increased during the reforming process to compensate for deactivation of the catalyst and to provide a product of a desired octane number.

The reforming reaction pressures are in the range of from about 0 psig to about 600 psig, preferably from about 15 psig to about 400 psig, and most preferably from 50 psig to 350 psig.

The liquid-volume hourly velocity (LHSV) of the substantially water-free hydrocarbon feed to the reformer reactor is in the range of from about 0.1 to about 100 hours$^{-1}$. The preferred LHSV of the substantially water-free hydrocarbon feed can be in the range of from about 0.25 to about 25 hours$^{-1}$.

The substantially water-free hydrocarbon feed of the invention is charged to the reformer reactor operating under reforming conditions. The substantially water-free hydrocarbon feed may be charged to the reformer reactor for a first time period during which the activity of the reformer catalyst decreases to an unacceptable activity.

It is an important aspect of the present invention for the hydrocarbon feed being charged to the reaction zone of the reformer reactor to be substantially water-free. It is preferred for the concentration of water in the substantially water-free hydrocarbon feed entering the reaction zone to be less than about 50 ppmw (parts per million by weight of the substantially water-free hydrocarbon feed), more preferably the concentration is less than about 25 ppmw, even more preferably it is less than about 5 ppmw, still more preferably the concentration is less than about 1 ppmw, and most preferably it is less than 0.1 ppmw.

The activity of the reformer catalyst can be measured by the temperature at which the reformer reactor must operate in order to yield a reformer product with a desired octane number. As used herein, the term "activity temperature" shall mean the reaction zone temperature representing the activity of a reformer catalyst employed in a reformer reactor yielding a product with a desired octane number.

During the first time period, the activity of the reformer catalyst may decrease from an acceptable activity, which is indicated by an acceptable activity temperature, to an unacceptable activity, which is indicated by an unacceptable activity temperature.

The acceptable activity temperature is a temperature that is greater than the minimum temperature required to reform a reformable hydrocarbon and less than the maximum operating temperature of the reformer system. The minimum temperature required to reform a reformable hydrocarbon typically exceeds about 750° F., more typically exceeds about 800° F., and most typically exceeds 825° F. The maximum operating temperature of a reformer system is either (1) the maximum allowable reaction zone temperature due to equipment limitations of the reforming system, or (2) the maximum reaction zone temperature which results in an uneconomical operation of the reforming system. Typically, the maximum operating temperature of a reformer system is less than about 1,300° F., more typically less than about 1,200° F., and most typically less than 1,150° F. Thus, typically the reaction zone temperature of a reformer system is in the range of from about 750° F. to about 1,300° F., more typically from about 800° F. to about 1,200° F., and most typically from 825° F. to 1,150° F.

The acceptable activity temperature is preferably the lowest activity temperature which yields a reformer product with a desired octane number under desired operating parameters. Preferably, the acceptable activity temperature is less than about 1,200° F., more preferably it is less than about 1,100° F., even more preferably it is less than about 1,000° F., and most preferably the acceptable activity temperature is less than 900° F.

The unacceptable activity temperature, which represents unacceptable catalyst activity, is an activity temperature which is greater than the acceptable activity temperature. Generally, the unacceptable activity temperature is more than about 2 percent higher than the acceptable activity temperature, which can be mathematically represented or calculated by multiplying the acceptable activity temperature by the numerical factor of 1.02. Less desirably, the unacceptable activity temperature is more than about 5 percent higher than the acceptable activity temperature, which can be mathematically represented or calculated by multiplying the acceptable activity temperature by the numerical factor of 1.05. Even less desirably, the unacceptable activity temperature is more than about 10 percent higher than the acceptable activity temperature, which can be mathematically represented or calculated by multiplying the acceptable activity temperature by the numerical factor of 1.10.

The time period necessary for the reformer catalyst activity to reach an unacceptable activity temperature can vary greatly depending on numerous reaction parameters, including, for example, composition of the substantially water-free hydrocarbon feed, composition of the catalyst, reaction pressure, diluent-to-hydrocarbon ratio, amount of water in the hydrocarbon feed, amount of nitrogen in the hydrocarbon feed, and amount of sulfur in the hydrocarbon feed.

It is an essential aspect of the present invention for a chlorine-containing additive to be introduced into the substantially water-free hydrocarbon feed being charged to the reformer reactor, without simultaneously introducing water, in an amount and for a time period that are effective to inhibit deactivation of the reformer catalyst. The period of injection of the chlorine-containing compound may be a second time period which is be effective to restore at least a portion, preferably a substantial portion of the decrease in the activity of the reformer catalyst.

A further essential aspect of the present invention is for the substantially water-free hydrocarbon feed entering the reaction zone during the second step to be substantially water-free. Preferably, the concentration of water in the substantially water-free hydrocarbon feed entering the reaction zone is held to a level less than about 50 ppmw (parts per million by weight of the hydrocarbon feed), more preferably less than about 25 ppmw, even more preferably less than about 5 ppmw, still more preferably less than about 1 ppmw, and most preferably less than 0.1 ppmw.

The chlorine-containing additive introduced into the substantially water-free hydrocarbon feed may be any chlorine-containing compound capable of inhibiting or reversing deactivation of a reformer catalyst when introduced into a substantially water-free hydrocarbon feed being charged to a reformer reactor. Preferably, the chlorine-containing additive is a nonmetallic compound. More preferably, the chlorine-containing additive is a nonmetallic organic compound. Presently preferred nonmetallic organic chlorides include, for example, hexachloroethane, carbon tetrachloride, 1-chlorobutane, 1-chloro-2-methyl propane, 2-chloro-2-methyl propane, tertiary butyl chloride, propylene dichloride, perchloroethylene and mixtures of two or more thereof. The presently most preferred nonmetallic organic chloride is perchloroethylene (PCE).

The chlorine-containing additive is introduced by injection into the substantially water-free hydrocarbon feed at a point located immediately upstream from the inlet of the reformer reactor. As used herein, the phrase "immediately upstream from the inlet of the reformer reactor" means a location wherein there is no substantial change in the composition of the substantially water-free hydrocarbon feed and the chlorine-containing additive between the additive injection point and the inlet of the reformer reactor.

The chlorine-containing additive may be injected in pure form or with a carrier. Preferably, the chlorine-containing additive is injected with a carrier. The carrier may be any compound capable of dissolving the chlorine-containing additive which does not have an adverse material impact on the reforming reaction. The carrier, however, may not be water. Preferably, the carrier is a hydrocarbon. Most preferably, the carrier is a hydrocarbon of substantially the same composition as the reformable hydrocarbons of the substantially water-free hydrocarbon feed.

The chlorine-containing additive may be injected into the substantially water-free hydrocarbon feed by any method known in the art. It is preferred for the additive injection method to result in exposing substantially all the reformer catalyst contained within the reaction zone of the reformer reactor to a substantially uniform amount of the chlorine-containing additive. A preferred injection system comprises an additive storage source connected in fluid flow communication with an additive moving means connected in fluid flow communication with an additive flow control means connected in fluid flow communication with an additive injection means. The additive storage source may be any conventional means of storing a quantity of a compound such as the chlorine-containing additive, for example, a storage tank. The additive moving means may be any conventional means of moving a quantity of a compound such as the chlorine-containing additive through a conduit, for example, a pump. The additive flow control means may be any conventional means for controlling the flow of a compound such as the chlorine-containing additive to and/or among reforming reactors, for example, a valve or valves. The additive injection means may be any conventional means for injecting a compound such as the chlorine-containing additive into a conduit carrying a hydrocarbon feed, for example, a nozzle or quill.

The rate of injection of the chlorine-containing additive into the substantially water-free hydrocarbon feed may be any rate that is effective to inhibit deactivation of the reformer catalyst and/or restore at least a portion, preferably a substantial portion of the decrease in the activity of the deactivated reformer catalyst. Preferably, the injection rate is a rate sufficient to provide a concentration of the chlorine-containing additive in the substantially water-free hydrocarbon feed of from more than about 0.01 ppmw (parts per million by weight of the hydrocarbon feed) to less than about 50 ppmw of the chlorine-containing additive in the substantially water-free hydrocarbon feed. More preferably, the injection rate provides a concentration of the chlorine-containing additive of from more than about 0.1 ppmw to less than about 10 ppmw of the chlorine-containing additive in the substantially water-free hydrocarbon feed. Still more preferably, the injection rate provides a concentration of the chlorine-containing additive of from more than about 0.2 ppmw to less than about 5 ppmw of the chlorine-containing additive in the substantially water-free hydrocarbon feed. Most preferably, the injection rate is such as to provide a chlorine-containing additive concentration in the substantially water-free hydrocarbon feed exceeding 0.4 ppmw but less than 2 ppmw.

The period injection of the chlorine-containing additive into the substantially water-free hydrocarbon feed may be any suitable period that is effective to inhibit deactivation of the reformer catalyst and/or restore at least a portion, preferably a substantial portion of the decrease in the activity of the deactivated reformer catalyst. Preferably the period of injection is from about 0.1 hours to about 5,000 hours, more preferably from about 0.5 hour to about 1,000 hours, still more preferably from about 1 hours to about 500 hours, and most preferably from about 4 hours to about 100 hours. During the period of injection of the chlorine-containing additive, the activity of the reformer catalyst may increase from an unacceptable activity, which is indicated by an unacceptable activity temperature, to a restored activity, which is indicated by a restored activity temperature.

The restored activity temperature is a temperature which is lower than the unacceptable activity temperature and higher than the minimum temperature necessary to reform a reformable hydrocarbon. Preferably, the restored activity temperature is a temperature lower than about 98 percent of the unacceptable activity temperature, which can be mathematically represented or calculated by multiplying the unacceptable activity temperature by the numerical factor of 0.98. More preferably, the restored activity temperature is lower than about 95 percent of the unacceptable activity temperature, which can be mathematically represented or calculated by multiplying the unacceptable activity temperature by the numerical factor of 0.95. Most preferably, the restored activity temperature is lower than about 90 percent lower of the unacceptable activity temperature, which can be mathematically represented or calculated by multiplying the unacceptable activity temperature by the numerical factor of 0.90.

The activity decrease experienced by the reformer catalyst during the first time period can be quantified as an "activity decrease value" which is calculated by subtracting the acceptable activity temperature from the unacceptable activity temperature, while the activity restoration experienced by the reformer catalyst during the second time period can be quantified as an "activity restoration value" which is calculated by subtracting the restored activity temperature from the unacceptable activity temperature. It is preferred in practicing the present invention that the activity restoration value be more than about 80% of the activity decrease value, which can be mathematically represented or calculated by multiplying the activity decrease value by 0.80. It is more preferred for the activity restoration value to be more than about 95% of the activity decrease value, which can be mathematically represented or calculated by multiplying the activity decrease value by 0.95. It is still more preferred for the activity restoration value to be more than about 98% of the activity decrease value, which can be mathematically represented or calculated by multiplying the activity decrease value by 0.98. It is most preferred in practicing the present invention that the activity restoration value be more than 100% of the activity decrease value, which can be mathematically represented or calculated by multiplying the activity decrease value by 1.00.

The time period necessary to restore a portion, preferably a substantial portion of the decrease in activity of the reformer catalyst can vary greatly depending on, for example, water-to-chloride ratio, rate of injection of the chlorine-containing additive, composition of the hydrocarbon feed, and composition of the reformer catalyst.

A further essential aspect of the present invention is for the injection of the chlorine-containing additive into the substantially water-free hydrocarbon feed to be terminated while simultaneously continuing to charge the substantially water-free hydrocarbon feed to the reformer reactor. The injection termination step is important because past chloriding methods teach that the introduction of water into the reaction zone either during or immediately after chloriding is necessary to suppress deactivation of the reformer catalyst and excess hydrocracking of the hydrocarbon feed.

The period of injection termination may be any suitable period that is effective to inhibit deactivation and/or promote the activity of the reformer catalyst. Preferably the period of injection termination is from about 0.1 hours to about 5,000 hours, more preferably from about 0.5 hour to about 1,000 hours, still more preferably from about 1 hours to about 500 hours, and most preferably from about 4 hours to about 100 hours.

A further essential aspect of the present invention is for the substantially water-free hydrocarbon feed entering the reaction zone during the period of injection termination to be substantially water-free. Preferably, the concentration of water in the substantially water-free hydrocarbon feed entering the reaction zone is held to a level less than about 50 ppmw (parts per million by weight of the hydrocarbon feed), more preferably less than about 25 ppmw, even more preferably less than about 5 ppmw, still more preferably less than about 1 ppmw, and most preferably less than 0.1 ppmw.

It is essential in practicing the present invention that no water be injected into the substantially water-free hydrocarbon feed or the reaction zone before, during, or after chloriding of the reformer catalyst. Thus, this invention eliminates the negative consequences of adding water to the a reformer reaction zone while, at the same time, substantially inhibiting and/or reversing the deactivation of the reformer catalyst.

The following examples are presented to further illustrate the present invention and are not to be considered as limiting the scope of the invention.

EXAMPLE

In this example, lab-scale tests are described to illustrate the process of this invention.

A stainless-steel reactor (having an inner diameter of about 0.75 inches and a height of about 28 inches) was filled with a top layer (13.75 inches high) of Alundum® (inert alumina particles having a surface area of 1 m²/g or less), a middle layer (10 inches high) of R-56 reforming catalyst (marketed by UOP, Des Plaines, Ill.; containing about 0.25 wt. % platinum, about 0.4 wt. % rhenium, and about 1.0 wt. % chlorine), and a bottom layer (7.75 inches high) of Alundum®.

The reactor bed was brought to a temperature of 940° F. and 200 psig. The catalyst was activated by introducing hydrogen and perchloroethylene (PCE) into the reactor for an activation period of 1 hour. During the activation period, PCE was introduced at a rate of 32 microliters/hour, while hydrogen was introduced a rate of 2 standard cubic feet/hour. After the activation period, the introduction of PCE was stopped, the reactor temperature was reduced to 840° F., and the reactor was purged with hydrogen for 30 minutes.

After purging, the reactor temperature was maintained at 840° F. and the reaction pressure was increased to 300 psig. A hydrocarbon feed and hydrogen were then charged to the reactor. The hydrocarbon feed was introduced at a LHSV of 2 hr$^{-1}$, and the hydrogen to hydrocarbon molar ratio was 5.3. The hydrocarbon feed comprised about 18.3 wt. % normal paraffins, about 35.7 wt. % iso-paraffins, about 5.2 wt. % olefins, about 32.8 wt. % naphthenes, and about 7.8 wt. % aromatics. The hydrocarbon feed had an initial boiling point of 177.9° F., a final boiling point of 258.3° F., a RON of 58.7, and a water content of less than 1 ppmw.

The reactor was run at the above-described reforming conditions for 12 days. During the first 5 days, no PCE was introduced. During the last 7 days, PCE was added to the hydrocarbon feed at a rate of 2 ppmw, using a repeating "pulsed" injection cycle wherein PCE was added for a period of 1 hour then terminated for a period of 5 hours. During the 12 day run, the reactor was shut down twice due to equipment problems. The first shut-down, which was necessitated by separator problems, began on day 3 at about 7:00 and ended on day 3 at about 15:15. The second shut-down, which was necessitated by flow meter problems, began on day 5 at about 10:40 and ended on day 6 at about 10:21.

The liquid product exiting the reactor was periodically sampled and analyzed. Table I, below, shows the timing of the samples, as well as the C5+ volume yield and RON of each sample.

TABLE 1

| Day | Sample Time | C5+ Yield (Vol. % of Feed) | RON |
|---|---|---|---|
| 1 | 10:17 | 74.75 | 80.89 |
| 2 | 6:59 | 88.55 | 81.66 |
| 3 | 6:50 | 88.62 | 81.55 |
| 4 | 7:34 | 78.62 | 80.7 |
| 5 | 7:17 | 79.85 | 81.8 |
| 6 | — | — | — |
| 7 | 7:18 | 80.20 | 81.09 |
| 8 | 10:00 | 84.54 | 83.94 |
| 9 | — | — | — |
| 10 | — | — | — |
| 11 | 6:57 | 86.67 | 85.42 |
| 12 | 7:35 | 85.83 | 85.3 |

Figure 2:
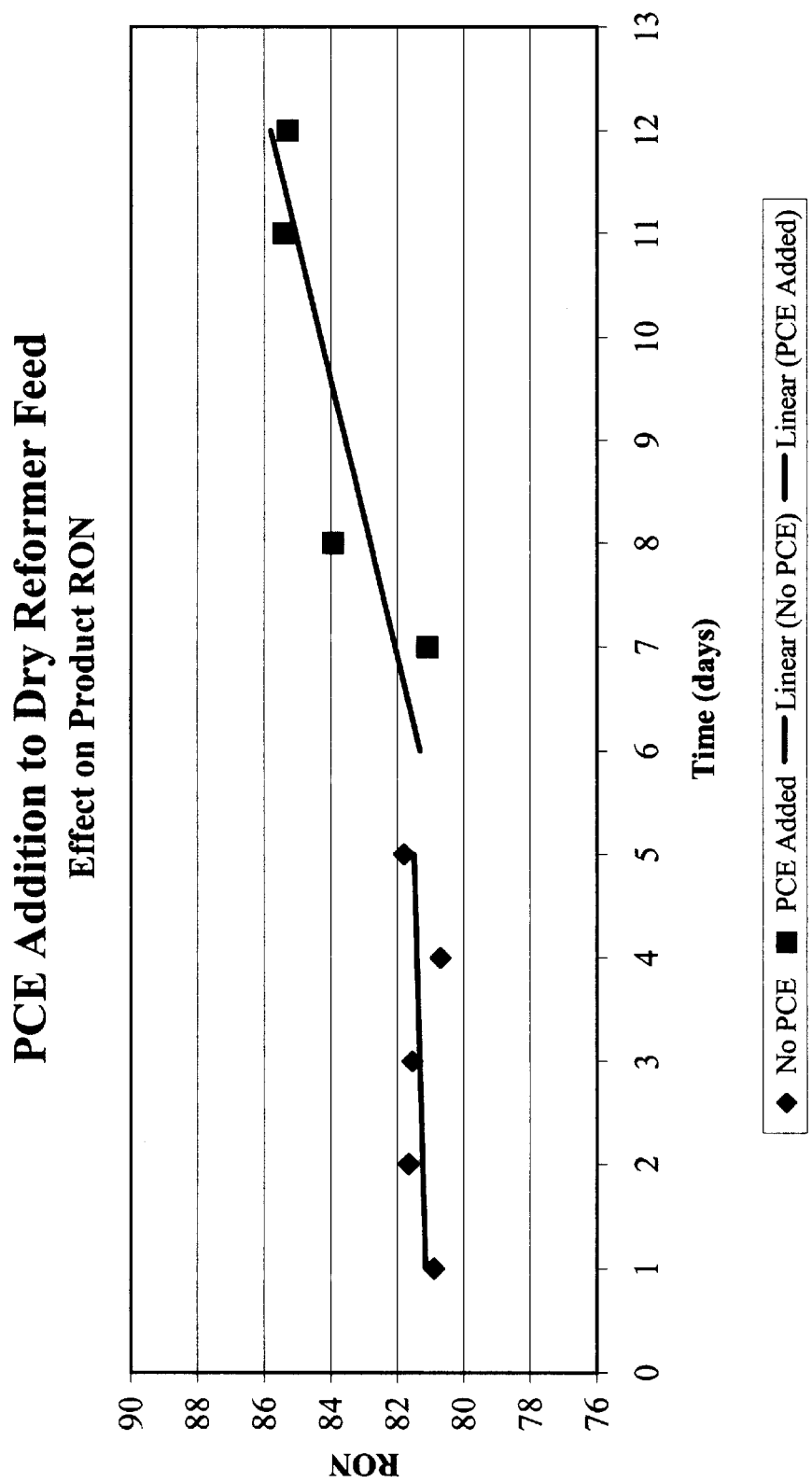
FIG. 2 is a chart plotting product RON as a function of time.

FIGS. 1 and 2 plot C5+ yield and RON from Table 1 as a function of time. FIG. 1 shows that when PCE is added to the dry hydrocarbon feed the C5+ yield increases. FIG. 2 shows that when PCE is added to the dry hydrocarbon feed catalyst activity increases, resulting in increased product RON.

While this invention has been described in detail for the purpose of illustration, it should not be construed as limited thereby but intended to cover all changes and modifications within the spirit and scope thereof.

That which is claimed is:

1. A reforming process comprising the steps of:
    charging a substantially water-free and substantially chlorine-containing compound-free hydrocarbon feed comprising a reformable hydrocarbon to a reformer reactor which defines a reaction zone containing a reformer catalyst, wherein said reformer reactor is operated under reforming conditions;
    thereafter, introducing into said substantially water-free and substantially chlorine-containing compound-free hydrocarbon feed, without simultaneously introducing water, a chlorine-containing additive in an amount and for a time period that are effective to inhibit deactivation of said reformer catalyst; and
    thereafter, terminating the introduction of said chlorine-containing additive and continuing the charging of said substantially water-free and substantially chlorine-containing compound-free hydrocarbon feed to said reformer reactor operated under reforming conditions without introducing water into said substantially water-free hydrocarbon feed.

2. A reforming process according to claim 1 wherein the amount of said chlorine-containing additive injected into said substantially water-free hydrocarbon feed is such as to provide a concentration of said chlorine-containing additive in said substantially water-free hydrocarbon feed of from about 0.1 ppmw to about 10 ppmw.

3. A reforming process according to claim 2 wherein said substantially water-free hydrocarbon feed contains less than about 5 ppmw of water.

4. A reforming process according to claim 3 wherein said chlorine-containing additive is a nonmetallic organic chloride.

5. A reforming process according to claim 4 wherein said reformer catalyst comprises platinum and alumina.

6. A reforming process according to claim 1 wherein the amount of said chlorine-containing additive injected into said substantially water-free hydrocarbon feed is such as to provide a concentration of said chlorine-containing additive in said substantially water-free hydrocarbon feed of from about 0.2 ppmw to about 5 ppmw.

7. A reforming process according to claim 6 wherein said substantially water-free hydrocarbon feed contains less than about 1 ppmw of water.

8. A reforming process according to claim 7 wherein said chlorine-containing additive is perchloroethylene.

9. A reforming process according to claim 8 wherein said reformer catalyst comprises platinum, alumina, rhenium, and chlorine.

10. A reforming process according to claim 9 wherein the amount of said chlorine-containing additive injected into said substantially water-free hydrocarbon feed is such as to provide a concentration of said chlorine-containing additive in said substantially water-free hydrocarbon feed of from 0.4 ppmw to 2 ppmw.

11. A reforming process comprising the steps of:
charging for a first time period a substantially water-free and substantially chlorine-containing compound-free hydrocarbon feed comprising a reformable hydrocarbon to a reformer reactor which defines a reaction zone containing a reformer catalyst having an activity, wherein said reformer reactor is operated under reforming conditions, and wherein said first time period is such that said activity of said reformer catalyst decreases from an acceptable activity that is indicated by an acceptable activity temperature to an unacceptable activity that is indicated by an unacceptable activity temperature; wherein said acceptable activity temperature is the lowest activity temperature which yields a reformer product with a desired octane number under desired operating parameters; and wherein said unacceptable activity temperature is the lowest activity temperature which yields a reformer product with a desired octane number but at an activity temperature higher than the desired operating parameters;

after said first time period, introducing a chlorine-containing additive, without simultaneously introducing water, into said substantially water-free and substantially chlorine-containing compound-free hydrocarbon feed in an amount and for a second time period that are effective to restore at least a portion of the decrease in said activity of said reformer catalyst, thereby increasing said activity of said reformer catalyst from said unacceptable activity to a restored activity; and after said second time period, terminating the introduction of said chlorine-containing additive and continuing the charging of said substantially water-free and substantially chlorine-containing compound-free hydrocarbon feed to said reformer reactor operated under reforming conditions without introducing water into said substantially water-free hydrocarbon feed.

12. A reforming process according to claim 11 wherein said acceptable activity temperature is less than about 1100° F. and wherein said unacceptable activity temperature is more than about 2% higher than said acceptable activity temperature.

13. A reforming process according to claim 12 wherein the amount of said chlorine-containing additive injected into said substantially water-free hydrocarbon feed is such as to provide a concentration of said chlorine-containing additive in said substantially water-free hydrocarbon feed of from about 0.1 ppmw to about 10 ppmw.

14. A reforming process according to claim 13 wherein said substantially water-free hydrocarbon feed contains less than about 5 ppmw of water.

15. A reforming process according to claim 14 wherein said chlorine-containing additive is a nonmetallic organic chloride.

16. A reforming process according to claim 15 wherein said reformer catalyst comprises platinum and alumina.

17. A reforming process according to claim 12 wherein the amount of said chlorine-containing additive injected into said substantially water-free hydrocarbon feed is such as to provide a concentration of said chlorine-containing additive in said substantially water-free hydrocarbon feed of from about 0.2 ppmw to about 5 ppmw.

18. A reforming process according to claim 17 wherein said substantially water-free hydrocarbon feed contains less than about 1 ppmw of water.

19. A reforming process according to claim 18 wherein said chlorine-containing additive is perchloroethylene.

20. A reforming process according to claim 19 wherein said reformer catalyst comprises platinum, alumina, rhenium, and chlorine.

21. A reforming process according to claim 20 wherein the amount of said chlorine-containing additive injected into said substantially water-free hydrocarbon feed is such as to provide a concentration of said chlorine-containing additive in said substantially water-free hydrocarbon feed of from 0.4 ppmw to 2 ppmw.

22. A reforming process comprising the steps of:
charging for a first time period a substantially water-free and substantially chlorine-containing compound-free hydrocarbon feed comprising a reformable hydrocarbon to a reformer reactor which defines a reaction zone containing a reformer catalyst having an activity, wherein said reformer reactor is operated under reforming conditions, wherein during said first time period said reformer catalyst experiences an activity decrease from an acceptable activity that is indicated by an acceptable activity temperature to an unacceptable activity that is indicated by an unacceptable activity temperature, and wherein said activity decrease is quantified as an activity decrease value that is calculated by subtracting said acceptable activity temperature from said unacceptable activity temperature; wherein said acceptable activity temperature is the lowest activity temperature which yields a reformer product with a desired octane number under desired operating parameters; and wherein said unacceptable activity temperature is the lowest activity temperature which yields a reformer product with a desired octane number but at an activity temperature higher than the desired operating parameters; and after said first time period, introducing perchloroethylene, without simultaneously introducing water, into said substantially water-free and substantially chlorine-containing compound-free hydrocarbon feed in an amount and for a second time period that are effective for said reformer catalyst to experience an activity restoration from said unacceptable activity to a restored activity that is indicated by a restored activity temperature, wherein said activity restoration is quantified as an activity restoration value that is calculated by subtracting said restored activity temperature from said unacceptable activity temperature, and wherein said activity restoration value is more than about 80% of said activity decrease value.

23. A reforming process according to claim 22 wherein said acceptable activity temperature is less than about 1100° F. and wherein said unacceptable activity temperature is more than about 2% higher than said acceptable activity temperature.

24. A reforming process according to claim 23 wherein the amount of perchloroethylene injected into said substantially water-free hydrocarbon feed is such as to provide a concentration of perchloroethylene in said substantially water-free hydrocarbon feed of from about 0.5 ppmw to about 50 ppmw.

25. A reforming process according to claim 24 wherein said substantially water-free hydrocarbon feed contains less than about 5 ppmw of water.

26. A reforming process according to claim 23 wherein said activity restoration value is more than about 95% of said activity decrease value.

27. A reforming process according to claim 26 wherein the amount of perchloroethylene injected into said substantially water-free hydrocarbon feed is such as to provide a concentration of perchloroethylene in said substantially water-free hydrocarbon feed of from about 5 ppmw to about 40 ppmw.

28. A reforming process according to claim 27 wherein said substantially water-free hydrocarbon feed contains less than about 1 ppmw of water.

29. A reforming process according to claim 28 wherein said reformer catalyst comprises platinum and alumina.

30. A reforming process according to claim 23 wherein said activity restoration value is more than about 98% of said activity decrease value.

31. A reforming process according to claim 30 wherein the amount of perchloroethylene injected into said substantially water-free hydrocarbon feed is such as to provide a concentration of perchloroethylene in said substantially water-free hydrocarbon feed of from 7.5 ppmw to 35 ppmw.

32. A reforming process according to claim 31 wherein said substantially water-free hydrocarbon feed contains less than 0.1 ppmw of water.

33. A reforming process according to claim 32 wherein said reformer catalyst comprises platinum, alumina, rhenium, and chlorine.

34. A method of inhibiting the deactivation of a reformer catalyst contained in a reaction zone of a reformer reactor, said method comprising the steps of:

contacting, under reforming conditions said reformer catalyst with a substantially water-free hydrocarbon feed containing a first concentration of a chlorine-containing additive for a time period that is effective to inhibit deactivation of said reformer catalyst; and thereafter, contacting, under reforming conditions said reformer catalyst with a substantially water-free hydrocarbon feed, wherein there exists a substantial absence of said chlorine-containing additive in said substantially water-free hydrocarbon feed.

35. A reforming process according to claim 34 wherein said first concentration is from about 0.1 ppmw to about 10 ppmw.

36. A reforming process according to claim 35 wherein said substantially water-free hydrocarbon feed contains less than about 5 ppmw of water.

37. A reforming process according to claim 36 wherein said chlorine-containing additive is a nonmetallic organic chloride.

38. A reforming process according to claim 37 wherein said reformer catalyst comprises platinum and alumina.

39. A reforming process according to claim 34 wherein said first concentration is from about 0.2 ppmw to about 5 ppmw.

40. A reforming process according to claim 39 wherein said substantially water-free hydrocarbon feed contains less than about 1 ppmw of water.

41. A reforming process according to claim 40 wherein said chlorine-containing additive is perchloroethylene.

42. A reforming process according to claim 41 wherein said reformer catalyst comprises platinum, alumina, rhenium, and chlorine.

43. A reforming process according to claim 42 wherein said first concentration is from 0.4 ppmw to 2 ppmw.

* * * * *